United States Patent
Naeve et al.

(10) Patent No.: US 7,911,338 B2
(45) Date of Patent: Mar. 22, 2011

(54) WIRELESS SYSTEM AND WIRELESS MODULE THEREFOR

(75) Inventors: Marco Naeve, Milwaukee, WI (US); Charles J. Luebke, Sussex, WI (US); Luis R. Pereira, Milwaukee, WI (US)

(73) Assignee: Eaton Corporation, Cleveland, OH (US)

( * ) Notice: Subject to any disclaimer, the term of this patent is extended or adjusted under 35 U.S.C. 154(b) by 658 days.

(21) Appl. No.: 11/830,087

(22) Filed: Jul. 30, 2007

(65) Prior Publication Data

US 2009/0033485 A1    Feb. 5, 2009

(51) Int. Cl.
    *G08B 1/08* (2006.01)
(52) U.S. Cl. .............. 340/539.23; 340/5.8; 340/572.4
(58) Field of Classification Search ........... 340/572.1, 340/572.4, 539.23, 539.22, 539.16, 539.17, 340/10.1, 5.8; 455/41.2
    See application file for complete search history.

(56) References Cited

U.S. PATENT DOCUMENTS

| | | | |
|---|---|---|---|
| 5,907,279 A | 5/1999 | Bruins et al. | |
| 6,614,351 B2 * | 9/2003 | Mann et al. | 340/572.1 |
| 6,946,817 B2 | 9/2005 | Fischer et al. | |
| 7,205,892 B2 | 4/2007 | Leubke et al. | |
| 2002/0119770 A1 * | 8/2002 | Twitchell, Jr. | 455/422 |
| 2005/0085180 A1 | 4/2005 | Ballay et al. | |
| 2005/0085248 A1 | 4/2005 | Ballay et al. | |
| 2005/0086366 A1 | 4/2005 | Luebke et al. | |
| 2005/0262519 A1 | 11/2005 | Luebke et al. | |
| 2005/0278519 A1 | 12/2005 | Luebke et al. | |
| 2006/0100002 A1 | 5/2006 | Luebke et al. | |
| 2006/0125632 A1 | 6/2006 | Luebke et al. | |
| 2006/0152480 A1 | 7/2006 | Senn | |
| 2006/0159260 A1 | 7/2006 | Pereira et al. | |
| 2006/0187203 A1 | 8/2006 | Piraneque et al. | |
| 2006/0197660 A1 | 9/2006 | Luebke et al. | |
| 2006/0198333 A1 | 9/2006 | Sabo et al. | |
| 2006/0199541 A1 | 9/2006 | Luebke et al. | |
| 2007/0056338 A1 | 3/2007 | Sabo et al. | |

OTHER PUBLICATIONS

Wikimedia Foundation, Inc., "Dongle", Wikipedia encyclopedia, http://en.wikipedia.org/wiki/Dongle, Apr. 2007, 3 pp.

* cited by examiner

*Primary Examiner* — Thomas J Mullen
(74) *Attorney, Agent, or Firm* — Martin J. Moran

(57) ABSTRACT

A wireless system includes a server having a port, a plurality of sensors or devices, each of which includes a wireless transceiver and a proximity sensor; and a wireless module. The wireless module includes a port interconnected with the port of the server, a wireless transceiver cooperating with the port of the wireless module, the wireless transceiver of the wireless module being structured to wirelessly communicate with the wireless transceiver of the sensors or devices, a proximity sensor structured to sense one of the sensors or devices, and a target structured to be sensed by the proximity sensor of such one of the sensors or devices. The port of the server is structured to cooperate with the port of the wireless module to transmit and receive wireless messages. The port of the wireless module cooperates with the wireless transceiver to transmit and receive the wireless messages.

26 Claims, 9 Drawing Sheets

WIRELESS SYSTEM AND WIRELESS MODULE THEREFOR

BACKGROUND OF THE INVENTION

1. Field of the Invention

This invention relates generally to wireless systems and, more particularly, to wireless systems employing a server and a number of sensors or devices, such as input sensors and/or output devices. The invention also relates to wireless modules for wireless systems.

2. Background Information

Wireless communication networks are an emerging new technology, which allows users to access information and services electronically, regardless of their geographic position.

All nodes in ad-hoc networks are potentially mobile and can be connected dynamically in an arbitrary manner. All nodes of these networks behave as routers and take part in discovery and maintenance of routes to other nodes in the network. For example, ad-hoc networks are very useful in emergency search-and-rescue operations, meetings or conventions in which persons wish to quickly share information, and in data acquisition operations in inhospitable terrains.

An ad-hoc mobile communication network comprises a plurality of mobile hosts, each of which is able to communicate with its neighboring mobile hosts, which are a single hop away. In such a network, each mobile host acts as a router forwarding packets of information from one mobile host to another. These mobile hosts communicate with each other over a wireless media, typically without any infra-structured (or wired) network component support.

In contrast to wired networks, mesh-type, low rate-wireless personal area network (LR-WPAN) wireless communication networks are intended to be relatively low power, to be self-configuring, and to not require any communication infrastructure (e.g., wires) other than power sources.

Relatively low power, radio frequency (RF) lighting control systems employ wall-mounted, battery powered, RF switch "sensors". Such a sensor sends a signal to a remote power control device, such as relay, in order to turn one or more house lights on and off.

It is known to provide a sensor system in which a plurality of sensors are connected, either directly with wires or indirectly with RF communications, to a central control and monitoring device. An example of such a sensor system is a security system, which may include a telephone line for dial out/in communication.

A known mechanism for associating a particular sensor with a given controller may involve pushing a button on the sensor while also pushing a button on the controller. This process usually requires two people or, else, one person to carry one device to the location of the other device. See, e.g., the description of related art section of U.S. Pat. No. 5,907,279.

U.S. Patent Application Pub. No. 2005/0085248 discloses a wireless system including a plurality of sensors, each including a first wireless port and a second program port, and a headless base station including a wireless port. A portable display and configuration fob includes a portable housing, a first wireless port wirelessly communicating with the wireless port of the base station, a second program port adapted for communication with the second program port of the sensors when engaged with or proximate that port, a rotary thumbwheel encoder, and a display. A processor receives engagement or proximity information from the second port of the portable fob, selects sensor information describing the sensors and responsive to the encoder, and sends the sensor information to the wireless port of the base station.

U.S. Pat. No. 7,205,892 discloses a method of joining a device or sensor to a wireless system by mating a fob with the device or sensor, thereby activating a proximity sensor in both the fob and the device or sensor. This causes a wireless message to be sent by each of the fob and the device or sensor back to a base station, which causes the device or sensor to join the wireless communication network.

There is room for improvement in wireless systems.

There is also room for improvement in wireless modules for wireless systems.

SUMMARY OF THE INVENTION

These needs and others are met by embodiments of the invention, which provide a wireless module, such as a displayless fob dongle, employed with a server, such as a personal computer or base station, to provide a lower cost wireless system including a number of sensors or devices, rather than requiring a fob with a display.

In accordance with one aspect of the invention, a wireless system comprises: a server comprising a port; a number of sensors or devices, each of the number of sensors or devices comprising a wireless transceiver and a proximity sensor; and a wireless module comprising: a port interconnected with the port of the server, a wireless transceiver cooperating with the port of the wireless module, the wireless transceiver of the wireless module being structured to wirelessly communicate with the wireless transceiver of the number of sensors or devices, a proximity sensor structured to sense one of the number of sensors or devices, and a target structured to be sensed by the proximity sensor of the one of the number of sensors or devices, wherein the port of the server is structured to cooperate with the port of the wireless module to transmit and receive wireless messages, the port of the wireless module cooperating with the wireless transceiver to transmit and receive the wireless messages.

The port of the wireless module and the port of the server may be USB ports; and the USB port of the wireless module may be interconnected with the USB port of the server by a USB cable having a length of about three feet to about six feet.

The wireless module may be structured to be powered from the port of the server.

The wireless transceiver of the wireless module and the wireless transceiver of the number of sensors or devices may be ZigBee wireless transceivers.

The one of the number of sensors or devices may be structured to sense the target and responsively send a first wireless message to the wireless transceiver of the wireless module; the server may be structured to receive the first wireless message and send a second wireless message to the one of the number of sensors or devices through the wireless transceiver of the wireless module, in order to confirm receipt of the first wireless message; the one of the number of sensors or devices may be structured to receive the second wireless message and responsively send a third wireless message to the wireless transceiver of the wireless module, the third wireless message including profile information of the one of the number of sensors or devices; and the server may be structured to receive the third wireless message and send a fourth wireless message to the one of the number of sensors or devices through the wireless transceiver of the wireless module, in order to confirm receipt of the third wireless message.

A number of the number of sensors or devices may be structured to send state information to the wireless transceiver of the wireless module.

The one of the number of sensors or devices may be a sensor structured to sense a condition change of an input and send a first wireless message to the wireless transceiver of the wireless module; and the server may be structured to receive the first wireless message and send a second wireless message to the sensor through the wireless transceiver of the wireless module, in order to confirm receipt of the first wireless message.

As another aspect of the invention, a wireless system comprises: a server comprising a port; a number of sensors or devices, each of the number of sensors or devices comprising a wireless transceiver and a proximity sensor; and a wireless module comprising: a port structured to be interconnected with the port of the server, a processor, a power source structured to be powered through the port of the wireless module when interconnected with the port of the server, and/or to temporarily power the wireless module when the port of the wireless module is disconnected from the port of the server, a wireless transceiver cooperating with the port of the wireless module, the wireless transceiver of the wireless module being structured to wirelessly communicate with the wireless transceiver of the number of sensors or devices, a proximity sensor structured to sense one of the number of sensors or devices, a target structured to be sensed by the proximity sensor of the one of the number of sensors or devices, and an annunciator structured to be activated after the proximity sensor of the wireless module senses one of the number of sensors or devices, and after the target is sensed by the proximity sensor of the one of the number of sensors or devices, wherein the port of the server is structured to cooperate with the port of the wireless module to transmit and receive wireless messages when the port of the server is interconnected with the port of the wireless module, the port of the wireless module cooperating with the wireless transceiver to transmit and receive the wireless messages, and wherein the wireless module is structured to transmit and receive wireless messages through the wireless transceiver thereof when disconnected from the port of the server.

The processor may comprise a nonvolatile memory structured to store information from one of the wireless messages received by the wireless transceiver of the wireless module when disconnected from the port of the server.

The processor may be structured to transfer the stored information from the nonvolatile memory and through the port of the wireless module to the port of the server after the wireless module is reconnected to the port of the server.

The power source may be a power module comprising a battery and a connector structured to connect to the port of the wireless module when disconnected from the port of the server, the power module being structured to temporarily power the wireless module when the port of the wireless module is disconnected from the port of the server.

The port of the wireless module and the port of the server may be USB ports; the connector may be a first USB connector having a first polarity; and the power module may further comprise a second USB connector having an opposite second polarity, the second USB connector being structured to be connected to the USB port of the server when the USB port of the wireless module is disconnected from the USB port of the server, the battery being charged from the USB port of the server and through the second USB connector.

As another aspect of the invention, a wireless system comprises: a server comprising a port; a number of sensors or devices, each of the number of sensors or devices comprising a wireless transceiver and a proximity sensor; a first wireless module comprising: a port interconnected with the port of the server, and a wireless transceiver cooperating with the port of the first wireless module, the wireless transceiver of the first wireless module being structured to wirelessly communicate with the wireless transceiver of the number of sensors or devices; and a second module separate from the first wireless module, the second module comprising a target structured to be sensed by the proximity sensor of one of the number of sensors or devices, wherein the port of the server is structured to cooperate with the port of the first wireless module to transmit and receive wireless messages, the port of the first wireless module cooperating with the wireless transceiver to transmit and receive the wireless messages.

The target may be a number of magnets; and the second module may comprise a molded housing housing the number of magnets therein.

The server may be structured to accept input to confirm that the one of the number of sensors or devices may join the wireless communication network.

The wireless transceiver of the first wireless module may be structured to receive one of the wireless messages from the one of the number of sensors or devices after the target of the second module is sensed by the proximity sensor of the one of the number of sensors or devices.

As another aspect of the invention, a wireless module is for a wireless system including a server having a port, the wireless system also including a number of sensors or devices, each of the number of sensors or devices comprising a wireless transceiver and a proximity sensor, the wireless module comprises: a port structured to be interconnected with the port of the server; a wireless transceiver cooperating with the port of the wireless module, the wireless transceiver of the wireless module being structured to wirelessly communicate with the wireless transceiver of the number of sensors or devices; a proximity sensor structured to sense one of the number of sensors or devices; and a target structured to be sensed by the proximity sensor of the one of the number of sensors or devices, wherein the port of the server is structured to cooperate with the port of the wireless module to transmit and receive wireless messages, the port of the wireless module cooperating with the wireless transceiver to transmit and receive the wireless messages.

As another aspect of the invention, a wireless module is for a wireless system including a server having a port, the wireless system also including a number of sensors or devices, each of the number of sensors or devices comprising a wireless transceiver and a proximity sensor, the wireless module comprises: a port structured to be interconnected with the port of the server; a processor; a power source structured to be powered through the port of the wireless module when interconnected with the port of the server, and/or to temporarily power the wireless module when the port of the wireless module is disconnected from the port of the server; a wireless transceiver cooperating with the port of the wireless module, the wireless transceiver of the wireless module being structured to wirelessly communicate with the wireless transceiver of the number of sensors or devices; a proximity sensor structured to sense one of the number of sensors or devices; a target structured to be sensed by the proximity sensor of the one of the number of sensors or devices; and an annunciator structured to be activated after the proximity sensor of the wireless module senses one of the number of sensors or devices, and after the target is sensed by the proximity sensor of the one of the number of sensors or devices, wherein the port of the server is structured to cooperate with the port of the wireless module to transmit and receive wireless messages when the port of the server is interconnected with the port of the wireless module, the port of the wireless module cooperating with the wireless transceiver to transmit and receive the wireless messages, and wherein the wireless module is structured to transmit and receive wireless messages through the wireless transceiver thereof when disconnected from the port of the server.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
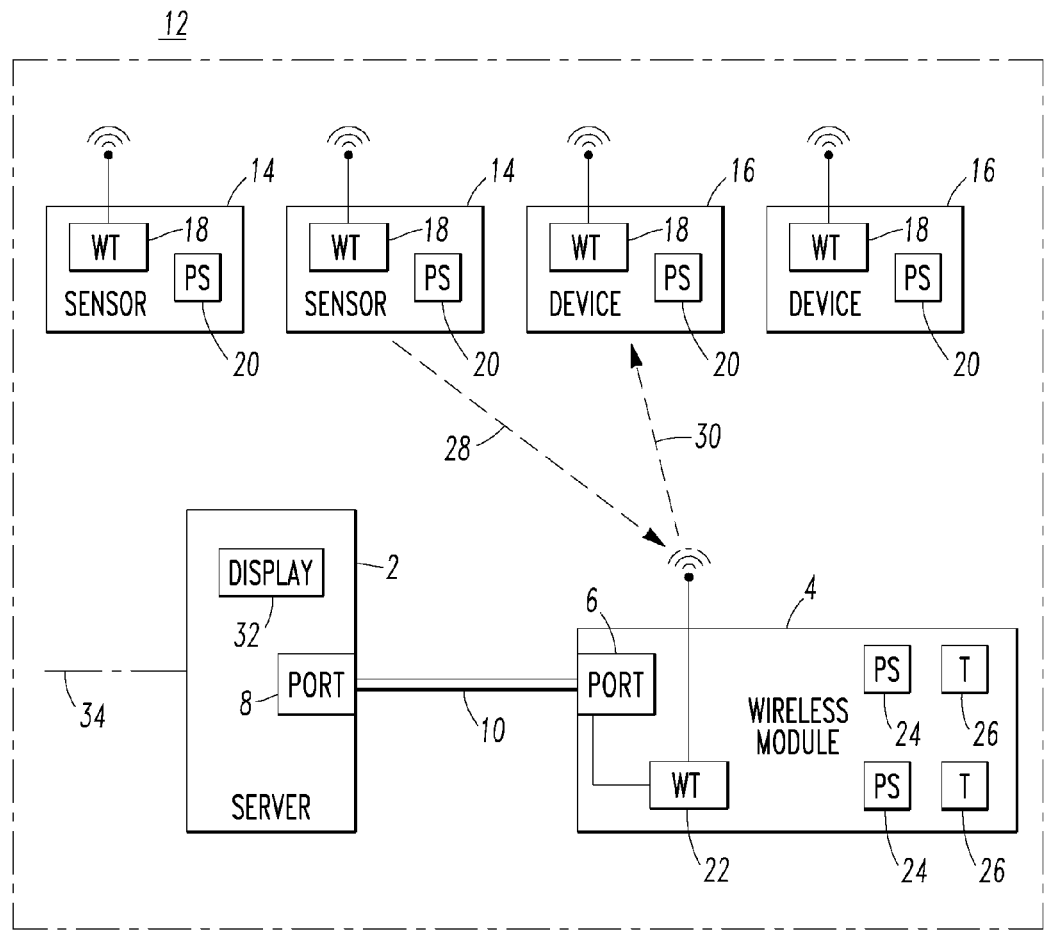
FIG. 1 is a block diagram of a wireless system including a personal computer (PC) base station, a fob dongle and a number of sensors or devices in accordance with embodiments of the invention.

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a networked processor; or any suitable processing device or apparatus.

As employed herein, the term "fob" means a portable handheld wireless communicating device.

As employed herein, the term "dongle" means a portable handheld hardware peripheral that couples to a server to authenticate or enable at least a portion of a wireless system. When the dongle is not present, the wireless system may run in a restricted mode or, else, may refuse to run.

As employed herein, the term "fob dongle" means a device having the functions of a "fob" and a "dongle".

As employed herein, the term "Universal Serial Bus" or "USB" means a serial bus standard of the USB Implementers Forum (USB-IF) to interface peripherals. USB allows peripherals to be connected using a single standardized interface socket. USB may improve plug-and-play capabilities by allowing peripherals to be connected and disconnected without rebooting the processor or server, may power low-consumption peripherals without the need for an external power supply, and may allow some peripherals to be used without requiring individual device drivers to be installed. USB can connect, for example and without limitation, computer peripherals, such as mice, keyboards, PDAs, gamepads and joysticks, scanners, digital cameras and printers.

As employed herein, the term "wireless" shall expressly include, but not be limited by, radio frequency (RF), light, visible light, infrared, ultrasound, wireless area networks, such as, but not limited to, IEEE 802.11 and all its variants (e.g., without limitation, 802.11a; 802.11b; 802.11g), IEEE 802.15 and all its variants (e.g., without limitation, 802.15.1; 802.15.3, 802.15.4), IEEE 802.16 and all its variants, other wireless communication standards (e.g., without limitation, ZigBee™ Alliance standard), HyperLan, DECT, PWT, pager, PCS, Wi-Fi, Bluetooth™, and cellular.

As employed herein, the term "wireless communication network" means a communication network employing wireless communications, such as, for example and without limitation, a wireless sensor network.

As employed herein, the term "wireless sensor network" means a network comprising spatially distributed autonomous nodes using devices to control outputs and/or sensors to receive inputs that cooperatively sense, for example, physical or environmental conditions, such as for example and without limitation, light, temperature, sound, vibration, pressure, motion or pollutants, at different locations. Non-limiting examples of wireless sensor networks include a wireless facilities management system or a wireless infrastructure management system employed for environment and/or habitat monitoring, healthcare applications, home automation, commercial lighting control or traffic control. Each node in a wireless sensor network is typically equipped with a radio transceiver or other suitable wireless communication device, a processor (e.g., small microcontroller), and an energy source, such as a battery or a mains-powered energy source.

As employed herein, the term "mains-powered" refers to any node, which has continuous power capabilities (e.g., powered from an AC outlet or AC receptacle or AC power source; AC/DC powered devices; rechargeable battery powered devices; other rechargeable devices), but excluding non-rechargeable battery powered devices.

As employed herein, the term "network coordinator" (NC) means any communicating node, which operates as the central controller in a wireless communication network.

As employed herein, the term "network device" (ND) means any communicating device (e.g., without limitation, a ballast; a portable wireless communicating device; a fob; a camera/sensor device; a wireless camera; a control device; and/or a fixed wireless communicating device, such as, for example, switch sensors, motion sensors or temperature sensors as employed in a wirelessly enabled sensor network), which participates in a wireless communication network, and which is not a network coordinator.

As employed herein, the term "node" means NDs, NCs, as well as any processing, logging and/or communicating device (e.g., without limitation, a portable communicating device; a fixed communicating device, such as, for example, switches, motion sensors or temperature sensors as employed in a wireless sensor network), which participates in a wireless communication network.

As employed herein, the term "sensor" means an apparatus structured to input data or information and to output related data or information to a wireless communication network. A sensor may optionally include or be operatively associated with zero or a number of devices. Non-limiting examples of sensors include sensors structured to sense light, switch sensors, pushbutton sensors, motion sensors, temperature sensors, sound sensors, vibration sensors, pollution sensors, current sensors and/or voltage sensors.

As employed herein, the term "device" means an apparatus structured to input data, information or a control command from a wireless communication network and to output corresponding data, corresponding information or a corresponding control action. A device may optionally include or be operatively associated with zero or a number of sensors. Non-limiting examples of devices include ballasts, lights, power relays, water valves, data collection and/or network bridges.

As employed herein, the term "ultra-capacitor" means a supercapacitor or other suitable electrochemical capacitor having a relatively high energy density when compared to conventional capacitors.

As employed herein, the term "server" means a base station or other suitable processor, which operates as the central controller in a wireless communication network.

As employed herein, the term "wireless system" means a wireless communication network including, for example, a server and a number of sensors or devices, which communicate, for example, using wireless communications.

As employed herein, the term "wireless module" means a ND, which is structured to interface a server.

As employed herein, the term "port" means an interface to or from a server or an interface to or from a wireless module. A port may be, for example and without limitation, a specialized outlet on a piece of equipment to which a plug or cable connects. Another non-limiting example is a USB port.

The invention is described in association with a wireless wellness or awareness system, although the invention is applicable to a wide range of wireless systems, including wireless nodes, for monitoring and/or configuring and/or control.

Referring to FIG. 1, a server 2 (e.g., without limitation, a base station; a personal computer (PC); a PC base station) and a wireless module 4 (e.g., without limitation, a fob dongle) are shown. A port 6 (e.g., without limitation, a mini USB type B socket) of the wireless module 4 is interconnected with a port 8 (e.g., without limitation, a USB port) of the server 2 by a suitable cable 10 (e.g., without limitation, a suitable USB cable).

A wireless system 12 (e.g., a wireless communication network) includes the server 2, a number of sensors 14 or devices 16, and the wireless module 4. Each of the sensors 14 or devices 16 includes a wireless transceiver (WT) 18 and a proximity sensor (PS) 20. The wireless module 4 includes a wireless transceiver (WT) 22 (e.g., without limitation, a ZigBee radio) cooperating with the wireless module port 6. The wireless transceiver 22 is structured to wirelessly communicate with the wireless transceivers 18 of the sensors 14 or devices 16. The wireless module 4 also includes a number of proximity sensors (PS) 24 structured to sense one of the sensors 14 or devices 16 (which include a number of targets (not shown)), and a number of targets (T) 26 (e.g., without limitation, a number of magnets) structured to be sensed by the proximity sensor 20 of the sensors 14 or devices 16. The server port 8 is structured to cooperate with the wireless module port 6 to transmit and receive wireless messages, such as 28,30. The wireless module port 6 cooperates with the wireless transceiver 22 to transmit and receive the wireless messages 28,30.

Example 1

The server 2 is, for example, a personal computer (PC), which includes a suitable user interface having a display 32.

For example, the PC may serve as the base station for the wireless system 12 of FIG. 1. The PC, in turn, may employ the wireless module 4 of FIGS. 1 and 2, the wireless module 4' of FIG. 3, or the wireless module 4" of FIG. 5. This lowers the cost of the wireless system 12 since, with the PC, no separate base station is required, and since, with one of the wireless modules 4,4',4", no separate fob is required. Furthermore, users (or third parties) may "modify" or enhance the function of the PC software related to the wireless system 12. Moreover, the Internet connection 34 (shown in phantom line drawing) (e.g., without limitation, through a broadband modem (not shown)), which may preferably be available via the PC, may be advantageously employed to send alerts external to the wireless system 12 (e.g., without limitation, out of the home or office or other structure).

Example 2

The wireless module port 6 and the server port 8 are, for example, USB ports, which are interconnected by a suitable or conventional USB cable 10 having a length, for example, of about three feet to about six feet. This permits the wireless module 4 to extend from the server 2 to one of the sensors 14 or devices 16. In this example, where the server 2 is a portable PC, the server 2 and, more particularly, the wireless module 4 may be positioned proximate a selected one of the sensors 14 or devices 16, such that the wireless module proximity sensor 24 can sense the selected sensor 14 or device 16, and the sensor or device proximity sensor 20 can sense the target 26 of the wireless module 4.

Example 3

As will be discussed, below, in connection with FIGS. 2, 3 and 5, the wireless module 4 is preferably structured to be powered, at least in part, from the server port 8.

Example 4

Although any suitable wireless transceivers may be employed, the example wireless transceivers 18,22 are ZigBee wireless transceivers.

Example 5

Figure 2:
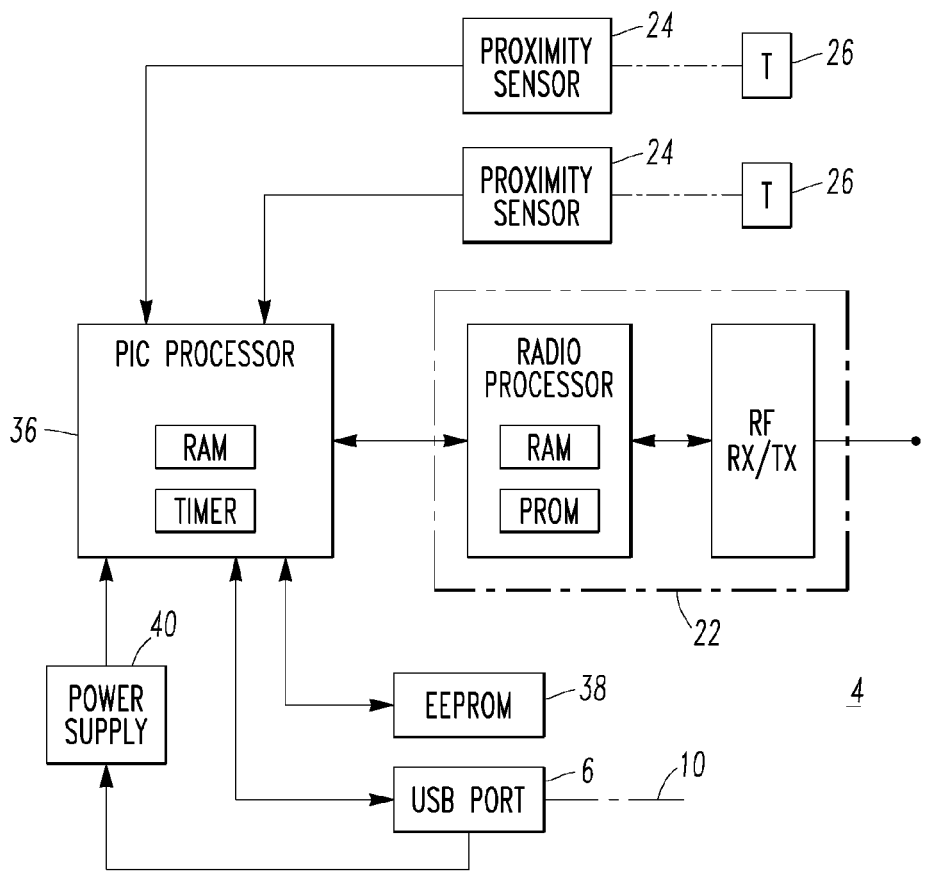
FIGS. 2 and 3 are block diagrams of fob dongles in accordance with embodiments of the invention.

As shown in FIG. 2, the example wireless module 4 is a USB fob dongle, which includes a ZigBee radio 22 and preferably has an external form factor similar to the form factors of the fobs of U.S. Pat. No. 7,205,892 or U.S. Patent Application Pub. No. 2006/0187203. This form factor allows the USB fob dongle to engage a sensor 14 or device 16 (FIG. 1) and trigger an authentication/join procedure (through one of the targets 26 and a pair of the proximity sensors 20,24) to join such sensor or device to the wireless system 12 (FIG. 1). Thus, as will be discussed below in connection with FIGS. 6A, 7 and 9, the wireless modules 4,4' (and the sensor 14 or device 16) provide a sensor or device authentication/join procedure similar to that of U.S. Pat. No. 7,205,892 or U.S. Patent Application Pub. No. 2005/0085248, which are incorporated by reference herein, but without requiring a separate fob. The advantage to triggering the proximity sensors 20,24 is to ensure that a new sensor 14 or a new device 16 is not inadvertently joined to the wireless system 12 through a simple "confirm" on the server 2.

Furthermore, no fob display is required because the server 2 (FIG. 1) is being used as the base station and as the user interface. Also, since the USB fob dongle is tethered to the server 2 with the USB cable 10, the fob battery and associated charging/protection circuitry is not required. As shown in FIG. 1, the wireless messages 28,30 go between wireless sensors 14 or wireless devices 16 via the USB fob dongle. The information from the wireless message 28 is available to the server 2 through the USB port 8. Similarly, the information for the wireless message 30 is available from the server 2 through the USB port 8. However, if the server 2 has the USB fob dongle removed, then it cannot wirelessly communicate and, instead, has to wait for the USB fob dongle to be reconnected. Here, the USB fob dongle provides two important functions: (1) a USB wireless dongle for the server 2; and (2) the proximity sensors 24 and targets 26 to engage a sensor 14 or device 16, in order to provide the authentication/join procedure to join such sensor or device to the wireless system 12. This configuration allows the wireless system 12 to simultaneously operate (run) and add new sensors 14 or new devices 16.

As shown in FIG. 2, the wireless module 4 also includes a suitable processor 36 (e.g., without limitation, a PIC processor), a suitable nonvolatile memory 38 (e.g., without limitation, EEPROM) and a suitable power supply 40, which in this example may derive power from the USB port 6 and the USB cable 10 from the server 2.

Example 6

Figure 3:
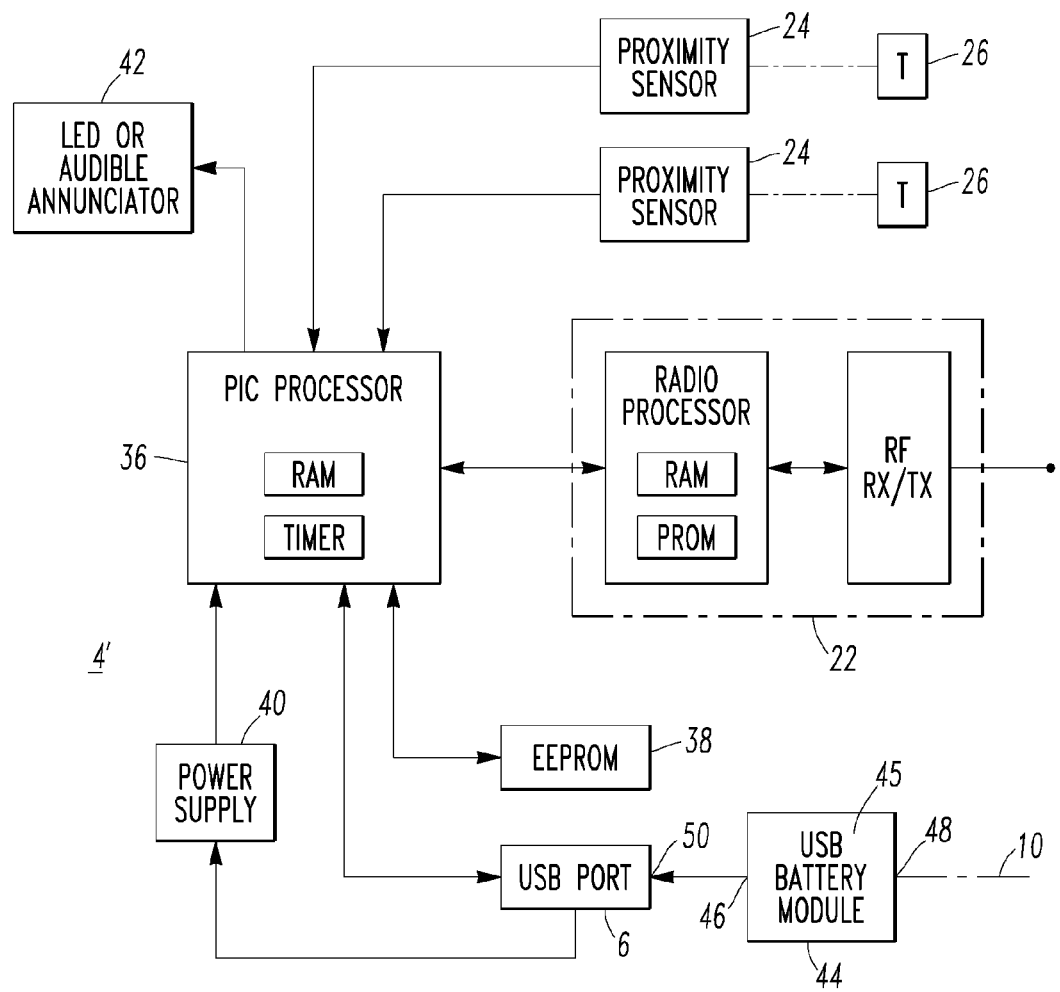

FIG. 3 shows the wireless module 4' (e.g., USB fob dongle), which is similar to the wireless module 4 of FIG. 2, except that this wireless module 4' can be decoupled from the server 2 for a suitable time (e.g., without limitation, a few minutes) to perform the authentication/join procedure of a new sensor 14 or new device 16 to the wireless system 12. The wireless module 4' includes a suitable annunciator 42 structured to be activated after the proximity sensor 24 senses one of the sensors 14 or devices 16, and after the target 26 is sensed by the proximity sensor 20 of such sensor 14 or device 16. Then, after the joining is performed and suitably annunciated (e.g., without limitation, visually through a visual indicator (e.g., LED); audibly through an audible annunciator (e.g., an audible tone)), the wireless module 4' keeps a register of the transaction in the nonvolatile memory 38, which may store information from a suitable number of recent join transactions (e.g., without limitation, information from the wireless message 28 and received by the wireless transceiver 22 when the wireless module 4' is disconnected from the server port 8) until such information can be transferred to the server 2. The annunciation confirms that the sensor 14 or device 16 has joined the wireless system 12 and indicates to the user to connect the wireless module 4' back to the server 2 to finalize the joining. Finally, when the wireless module 4' is coupled back to the server 2, the authentication is finalized as will be discussed, below, in connection with FIG. 7.

The wireless module 4' has the advantage of being completely untethered from the server 2, in order that the sensors 14 or devices 16 can be authenticated/joined in situ. Also, suitable confirmation is provided of the sensor 14 or device 16 joining the wireless system 12 through the annunciator 42. The server port 8 cooperates with the port 6 of the wireless module 4' to transmit and receive information for wireless messages when the server port 8 is interconnected with such wireless module port 6. However, as has been discussed, the wireless module 4' is also structured to transmit and receive wireless messages through the wireless transceiver 22 thereof when the wireless module 4' is disconnected from the server port 8.

Example 7

The power supply 40 is a power source structured to be powered through the example USB port 6 of the wireless module 4' when it is interconnected by the USB cable 10 (shown in phantom line drawing) with the server port 8 (FIG. 1) and/or to temporarily power the wireless module 4' when the USB port 6 is disconnected from the server port 8. Although the power supply 40 may include a battery (not shown), alternatively, a suitable optional USB battery module 44 may be employed. Here, the USB battery module 44 may be externally connected to the wireless module 4' and/or may be recharged, as needed, through the cable 10 and server port 8. For example, the user may disconnect the wireless module 4' from the server port 8 and couple the USB battery module 44 to the wireless module 4' while using the same to join sensors 14 or devices 16 to the wireless system 12. Thus, the USB battery module 44 is a power module including a battery 45 and a connector 46 structured to connect to the wireless module port 6 when it is disconnected from the server port 8. The module 44 is structured to temporarily power the wireless module 4' when the wireless module port 6 is disconnected from the server port 8.

In this manner, a temporary power source for the wireless module 4' is contained in the separate battery powered module 44. The module 44 includes a first USB plug/connector 46 (e.g., without limitation, plug or female gender) and a second USB plug/connector 48 (e.g., without limitation, connector or opposite male gender), in order that the wireless module 4' is powered when it is mated with the separate module 44, as shown. The USB port 6 has a USB plug/connector 50, which has the same gender as the USB plug/connector 48, both of which can receive the USB cable 10. Also, when the USB cable 10 is connected between the USB plug/connector 48 and the server 2 (FIG. 1), the battery 45 of the module 44 may be recharged. Since the USB battery module 44 has both male and female connectors on opposite ends, it may be inline (i.e., series) coupled with the wireless module 4', in order that the USB battery module 44 may be charged through USB plug/connector 48 while plugged into or suitably connected to the server port 8.

The module 44 permits the wireless module 4' to be untethered from the server 2, although this does not permit the wireless system 12 to both operate (run) and add new sensors 14 or new devices 16 simultaneously. Here, there is a conscious decision to take the system 12 "offline" to add new nodes.

Example 8

Figure 5:
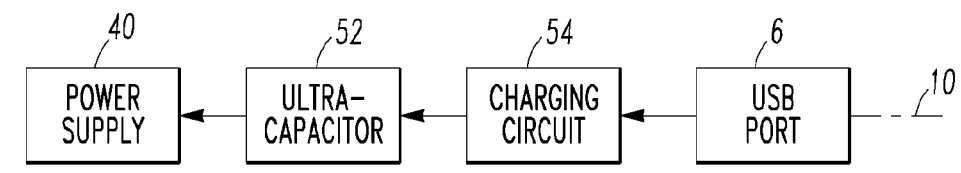
FIG. 5 is a block diagram of a portion of a fob dongle in accordance with another embodiment of the invention.

FIG. 5 shows a portion of the wireless module 4" (e.g., USB fob dongle), which may be the same as the wireless modules 4,4' of FIGS. 2 and 3, except that this wireless module 4" includes an ultra-capacitor 52 and a charging circuit 54 between the USB port 6 and the power supply 40. The ultra-capacitor 52 provides a temporary source of power for the power supply 40. The charging circuit 54 charges the ultra-capacitor 52 from the server port 8 (FIG. 1) when the USB port 6 is interconnected by the USB cable 10 (shown in phantom line drawing) to the server port 8.

Example 9

Figure 4:
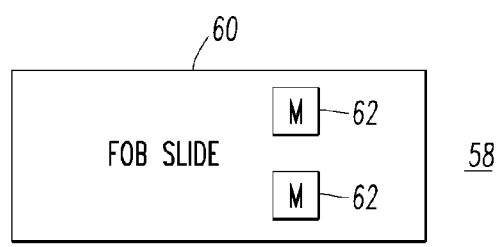
FIG. 4 is a block diagram of a fob slide in accordance with another embodiment of the invention.
Figure 11:
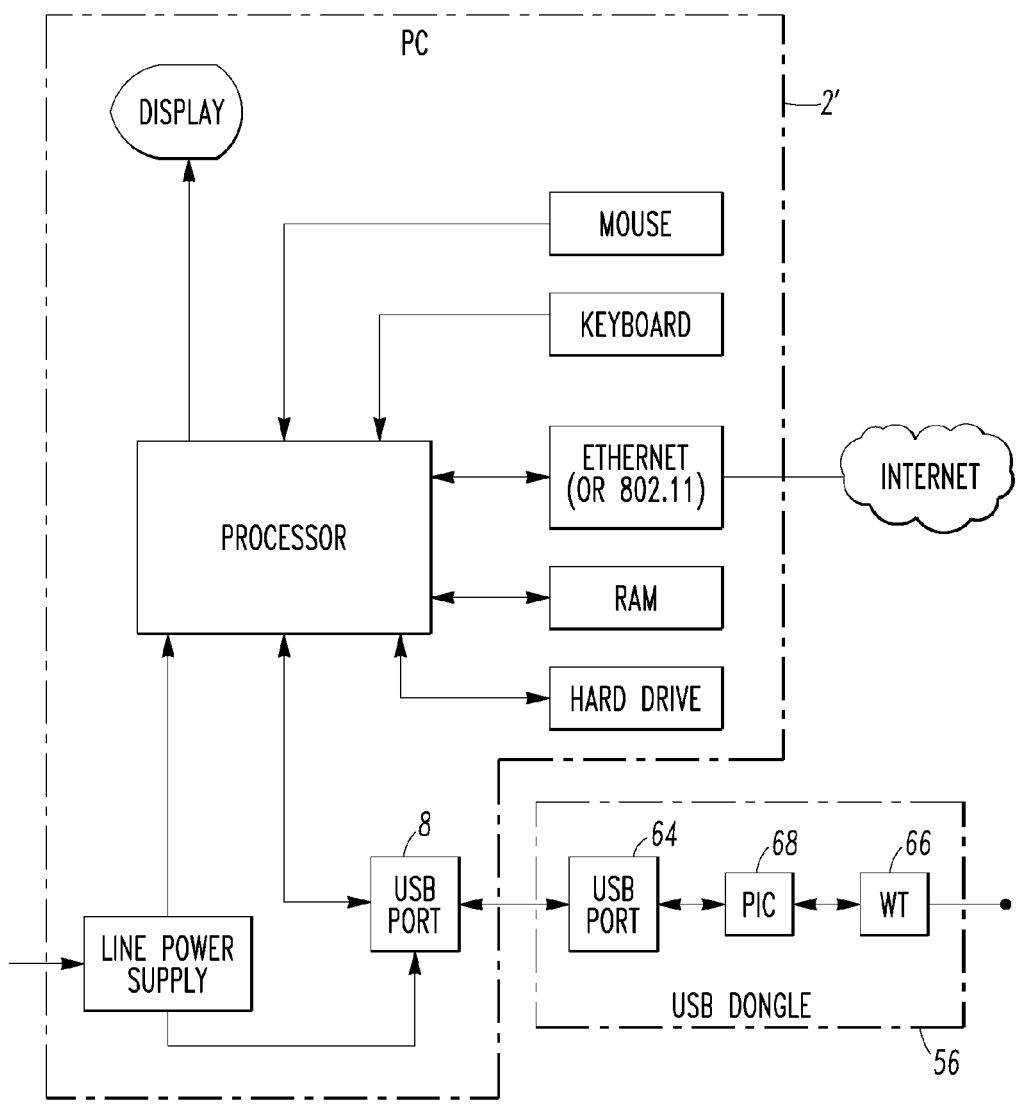
FIG. 11 is a block diagram in schematic form of the PC base station and the fob dongle of FIG. 1.

Referring to FIGS. 4 and 11, a conventional USB ZigBee dongle 56 is coupled to the USB port 8 of a PC 2' and a separate fob slide 58 is employed to trigger the authentication/join procedure of a new sensor 14 or new device 16 to the wireless system 12 of FIG. 1. The server port 8 (FIG. 11) is structured to cooperate with the USB port 64 of the USB ZigBee dongle 56 to transmit and receive wireless messages. The USB port 64, in turn, cooperates with a wireless transceiver (WT) 66 through a PIC processor 68 to transmit and receive wireless messages.

The fob slide 58 is, for example, a molded plastic housing 60 with a number of targets (e.g., without limitation, magnets (M) 62) embedded therein. This preferably has an external form factor similar to the form factors of the fobs of U.S. Pat. No. 7,205,892 or U.S. Patent Application Pub. No. 2006/0187203. This form factor allows the fob slide 58 to engage a sensor 14 or device 16 (FIG. 1) and trigger an authentication/join procedure (e.g., through the magnets 62 one of which may be detected by the proximity sensor 20 of one of the number of sensors 14 or devices 16) to join such sensor or device to the wireless system 12 (FIG. 1). Here, the fob slide 58 is a module separate from the USB ZigBee dongle 56.

When the user selects the appropriate commissioning screen (not shown) on the PC 2', the authentication/join procedure is enabled at the PC 2'. Then, when the fob slide 58 (FIG. 4) slides into a sensor 14 or device 16 (FIG. 1), it triggers the proximity sensor 20 thereof to initiate the join procedure, which sends a wireless message (e.g., 28) by such sensor or device. Here, there is no corresponding wireless message from the fob slide 58. Hence, the user must manually confirm (authenticate) at the PC 2' that the sensor 14 or device 16 can join the wireless system 12.

This example allows the wireless system 12 (FIG. 1) to operate (run) and add new sensors 14 or devices 16 (simultaneously). Wireless messages (e.g., without limitation 28,30) go between the PC 2' and the wireless sensor 14 or wireless device 16 via the conventional USB ZigBee dongle 56. Another advantage of this example is that the user can test the range and location of the wireless communication link between the installed device 16 or sensor 14 and the PC 2' at the time of commissioning. If the PC 2' has this dongle 56 removed, then it cannot wirelessly communicate and, instead, has to wait for the dongle 56 to be reconnected.

Example 10

Figure 6A:
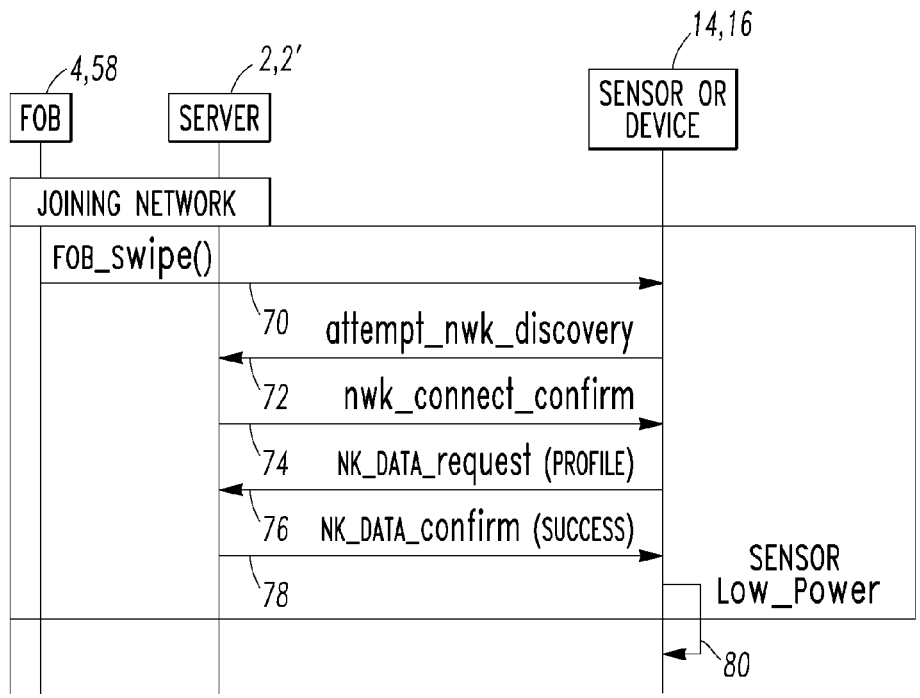
FIG. 6A is a message diagram showing a sensor or device joining a wireless system using the fob dongle of FIG. 1 or the fob slide of FIG. 4.

Referring to FIG. 6A, a message diagram shows a sensor 14 or device 16 joining the wireless system 12 of FIG. 1 using either the wireless module 4 of FIG. 1, or, alternatively, the USB ZigBee dongle 56 of FIG. 11 and the fob slide 58 of FIG. 4. First, at 70, either the wireless module 4 or the fob slide 58 is engaged with (e.g., without limitation, swiped against) the sensor 14 or device 16. This triggers the sensor 12 or device 14 to start the authentication/join procedure. During the following process, the server 2,2' receives and sends wireless messages via its (electrical) USB port 8 and the wireless module 4 or the USB ZigBee dongle 56.

In response to the engagement (e.g., sensing the target 26 of FIG. 1; sensing the magnet 62 of FIG. 4), the sensor 14 or device 16 sends an attempt network discovery wireless message 72 to the corresponding server 2,2'. This message is received by the wireless module 4 or the USB ZigBee dongle 56, respectively. Next, if the corresponding server 2,2' is in range, then it sends back a network connection confirmation wireless message 74 through the wireless module 4 (wireless transceiver 22) or the USB ZigBee dongle 56 (wireless transceiver 66), respectively, to the sensor 14 or device 16, in order to confirm receipt of the first wireless message 72. Then, in response to receipt of the wireless message 74, the sensor 14 or device 16 responsively sends its own identifier and profile information in a wireless message 76 to the corresponding server 2,2'. Next, after receipt of the profile information wireless message 76, the corresponding server 2,2' responsively sends a confirmation success wireless message 78 to the sensor 14 or device 16, in order to confirm receipt of the wireless message 76. Here, also, the server 2,2' is preferably structured to accept input from a user (not shown) to confirm that the sensor 14 or device 16 may join the wireless system 12 of FIG. 1. Finally, at 80, in response to receipt of the wireless message 78, the sensor 14 or device 16 preferably goes to sleep in a suitable low power state.

Example 11

Figure 6B:
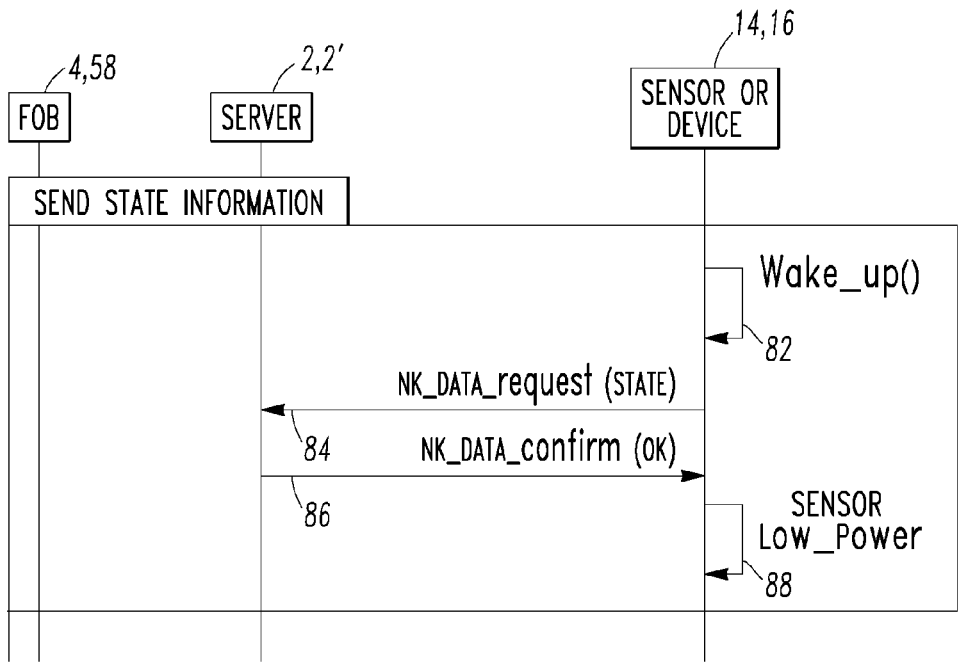
FIG. 6B is a message diagram showing a sensor or device sending state information to the server of FIG. 1 or the server of FIG. 11.

FIG. 6B is a message diagram showing the sensor 14 or device 16 sending state information to the server 2 of FIG. 1 or the server 2' of FIG. 11. When a sensed input changes condition or an output condition changes (or there is a timeout), then the sensor 14 or device 16 wakes up, at 82, and responsively sends the state information in a wireless message 84 to the wireless transceiver 22,66. In response, the corresponding server 2,2' responsively confirms receipt through wireless message 86. Here, the server 2,2' receives the wireless message 84 and sends a second wireless message 86 to the sensor 14 or device 16 through the wireless transceiver 22 of the wireless module 4 or through the wireless transceiver 66 of the USB ZigBee dongle 56, in order to confirm receipt of the wireless message 84. Here, unlike a conventional fob (not shown), the server 2,2' does not send any update information to the wireless module 4 (wireless transceiver 22) or to the USB ZigBee dongle 56 (wireless transceiver 66), since such update information is not needed by the wireless module 4 or by the USB ZigBee dongle 56. Finally, at 88, in response to receipt of the wireless message 86, the sensor 14 or device 16 preferably goes to sleep in a suitable low power state.

Example 12

Figure 7:
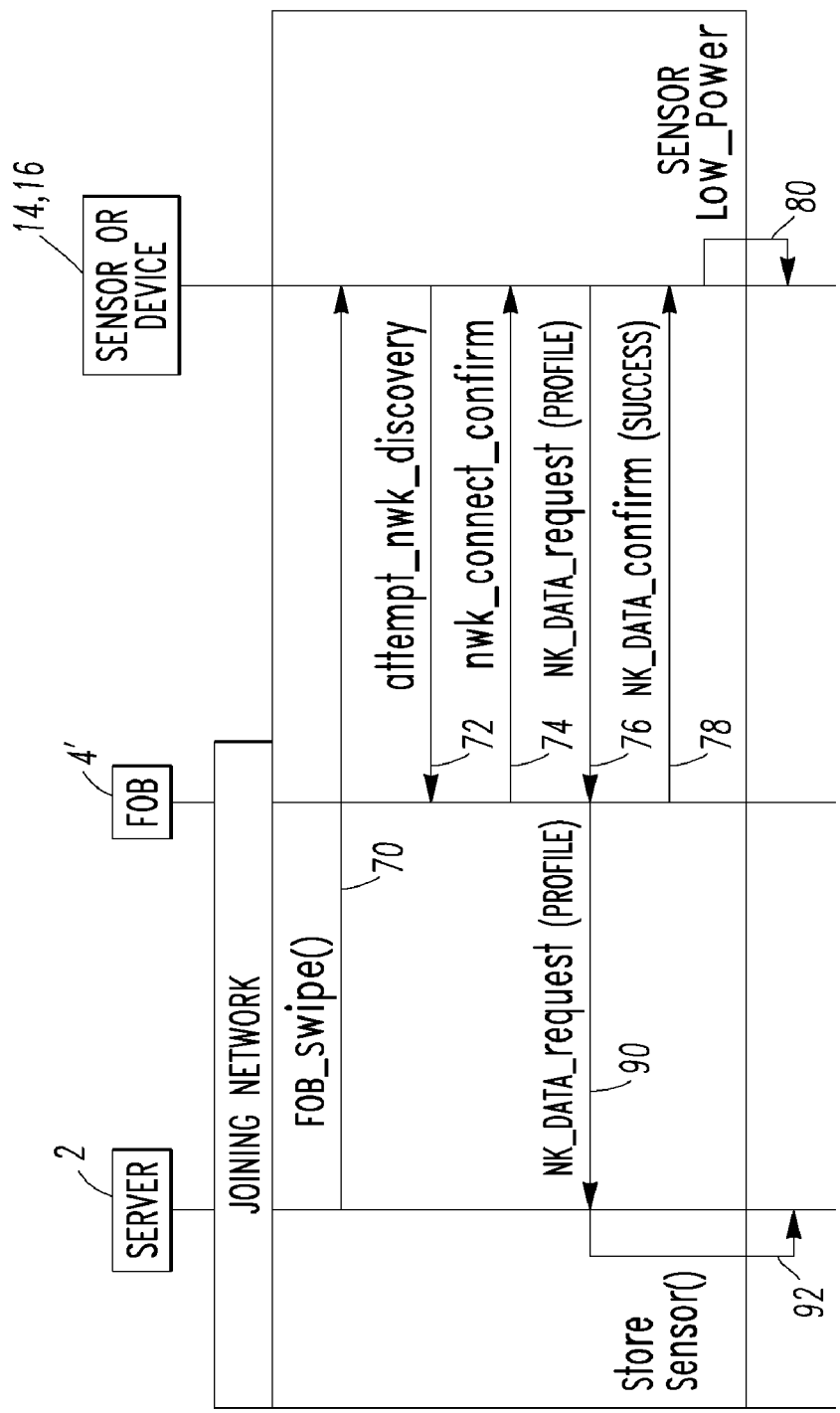
FIG. 7 is a message diagram showing a sensor joining a wireless system using the fob dongle of FIG. 3 or 5 in accordance with another embodiment of the invention.

FIG. 7 is a message diagram showing the sensor 14 or device 16 joining the wireless system 12 of FIG. 1 using the fob dongle 4' of FIG. 3. Unlike FIG. 6B and Example 11, which does not store the identifier and profile information, this example stores the identifier and profile information temporarily in the fob dongle 4' until it is reconnected to the server 2. In this message diagram, the fob dongle 4' stores the sensor/device identifier and profile information when the fob dongle 4' is not coupled to the server 2. Here, the wireless messages 72,74,76,78 all interact between the sensor 14 or device 16 and the disconnected fob dongle 4' of the server 2. The server 2 is not involved at that time because the fob dongle 4' is not connected to the server 2 (i.e., no wireless communications are available to the server 2).

Upon receipt of the wireless message 76, the processor 36 of the fob dongle 4' is structured to activate the annunciator 42. This occurs after the proximity sensor 24 of the wireless module 4' senses one of the sensors 14 or devices 16, after the target 26 is sensed by the proximity sensor 20 of such one of the sensors or devices, and after such one of the sensors or devices is joined to the wireless system 12 of FIG. 1. When the annunciator 42 is activated, the USB port 6 of the wireless module 4' is ready to be reconnected to the USB port 8 of the server 2.

Later, when the fob dongle 4' is reconnected to the server 2 (e.g., without limitation, after all devices 16 and sensors 14 have been joined; after a suitable number of devices 16 and sensors 14 have been joined), the server 2 pulls the device/sensor profile(s), including the identifier and profile information thereof, from the fob dongle 4' in a message 90 and stores the same at 92 in the nonvolatile memory 38. The processor 36 is structured to transfer the stored information from the nonvolatile memory 38 and through the USB port 6 of the wireless module 4' to the USB port 8 of the server 2 after such wireless module is reconnected to such server USB port.

Example 13

Figure 8:
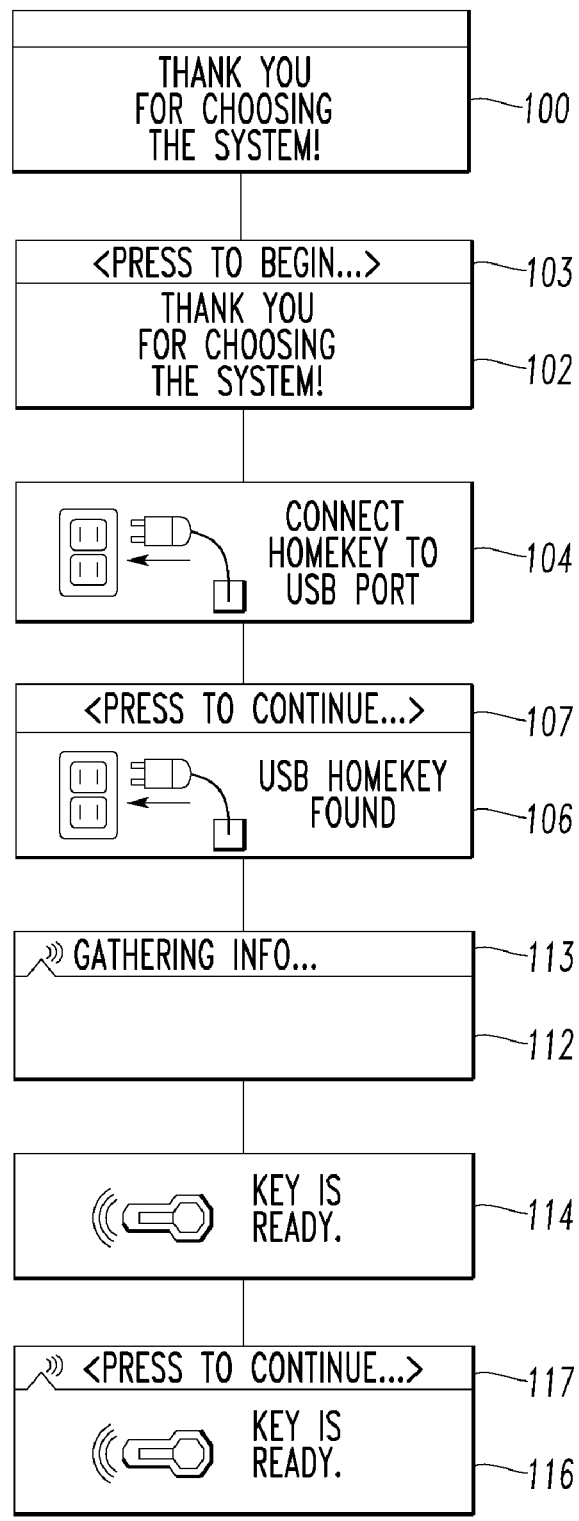
FIGS. 8-10 are block diagrams showing the user interface of the PC of FIG. 1 in accordance with embodiments of the invention.

FIG. 8 shows the user interface of the server 2 of FIG. 1, which is employed to configure the wireless modules 4,4' and the server 2. First, screen 100 thanks the user for choosing the system 12. This is followed by screen 102, which prompts the user, at 103, to press a key (e.g., without limitation, of a PC keyboard or mouse) (not shown) to begin. Next, screen 104 instructs the user to connect the wireless module 4,4' to the server USB port 8. Then, screen 106 informs the user that the wireless module 4,4' was found and prompts the user, at 107, to press a key to continue. Next, the screen 112 informs the user, at 113, that the wireless module 4,4' is gathering (or exchanging) information with the server 2 by exchanging a series of messages (not shown) over the USB ports 6,8. Then, the screen 114 informs the user that the wireless module 4,4' is ready. Finally, the screen 116 prompts the user, at 117, to press a key to continue.

Example 14

Figure 9:
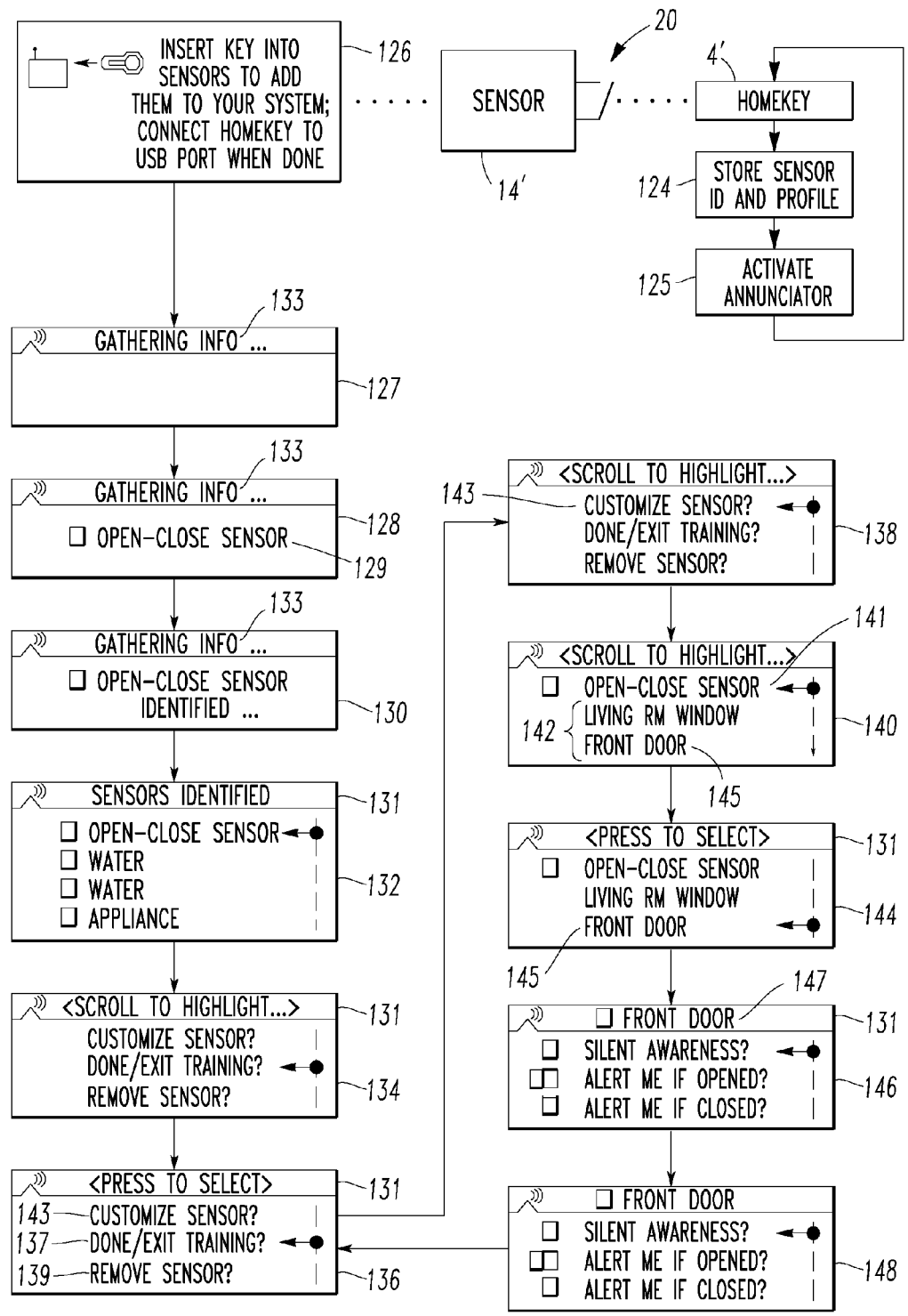

FIG. 9 shows the user interface of the server 2 for the wireless module 4' of FIG. 3. At screen 126, the user is instructed to insert the wireless module 4' into a number of sensors 14 or devices 16 (e.g., a non-configured sensor 14') in order to add such number of sensors or devices to the system 12 of FIG. 1. When done, the wireless module 4' is reconnected to the server USB port 8. In summary, when one of the sensors 14 or devices 16 (FIG. 1) is keyed in this manner, the wireless module 4' begins gathering corresponding information, stores the sensor identifier and profile at 124, and activates the annunciator 42, at 125, in order to report the success to the user.

The wireless module 4' provides the ability to customize the sensor 14', with the message region 131 cycling through two messages "<scroll to highlight . . . >" and "<press to select>" (e.g., without limitation, "enter" key of a PC keyboard; a mouse button). Following the screen 126, the screen 127 reports that the wireless module 4' is gathering information. This is possible, because there are two, and only two, nodes in the system 12 (e.g., the wireless module 4' and the particular sensor 14', which are mated and which have their corresponding proximity sensors 20,24 active at any one time). When the sensor proximity sensor 20 is activated by mating with the wireless module 4', the sensor 14' sends a request to the wireless module 4' to join the system 12 (attempt network discovery 72 of FIG. 7). The wireless module proximity sensor 24 (FIG. 3) is also activated (e.g., simultaneously) by mating with the sensor 14', and the wireless module 4' also sends a "program sensor" message through the ports 6,8 to the server 2. By receiving this "confirmation" message from the wireless module 4', the server 2 knows to accept this sensor 14' to the system 12, and sends a nwk_connect_confirm message 74 of FIG. 7. Next, screen 128 reports the type of sensor (e.g., an Open-Close Sensor 129 in this example). Then, screen 130 reports that the sensor 14' is identified and screen 132 removes the "<gathering info . . . >" message 133. Screen 132 also lists the identified sensors 14 or devices 16 in the order in which such sensors or devices were joined to the wireless system 12 of FIG. 1.

Next, the screens 134 and 136 prompt the user to "<scroll to highlight . . . >" and "<press to select>" one of the three displayed actions: "Customize sensor?" 143, "Done/Exit Training?" 137 And "Remove Sensor?" 139. If the user selects "Customize sensor?" 143 at screen 138, then screen 140 is displayed, which confirms that the sensor 14' is an "Open-Close Sensor" 141 and lists in the lower menu 142 the possible names of that sensor. In this example, there are two possible names shown, which are based upon the possible locations for such a sensor: Living R(oo)m Window and Front Door, wherein the parenthetical portion of those names is truncated for display in this example. Also, in this example, there may be one, three or more names. Next, after the user highlights one of the names, such as Front Door 145, the screen 144 prompts the user to press a suitable key (not shown), in order to select that name. Next, after the user selects the name, the screen 146 displays the name, Front Door 147, in the message region 131, and prompts the user to select one of the sensor awareness levels, for example, "Silent awareness?", "Alert me if opened?" and "Alert me if closed?". Although, zero, one, two, three or more awareness levels may be employed for a particular sensor, in this example, "Silent Awareness?" means that an audible buzzer (not shown) of the server 2 is inactive regardless of the state of that sensor. Otherwise, the user can select that an audible alert as determined by the server 2 be sounded if that configured sensor is opened or if such sensor is closed. Next, at screen 148, the user, in this example, selects "Silent awareness?", which causes the screen 136 to be redisplayed. At that point, if the user selects the "Done/Exit Training?" option 137, then the newly entered information for the sensor 14' is stored by the server 2. Alternatively, if the user selects the "Remove sensor?" option 139, and regardless whether the sensor 14' was previously added, that information for such sensor is employed by the server 2, in order to remove the sensor 14' from the system 12. Finally, if the user selects the "Customize sensor?" option 143, screen 138 is redisplayed, no information is saved by the server 2, and the user is prompted to re-enter the information to customize the sensor 14'.

Example 15

Figure 10:
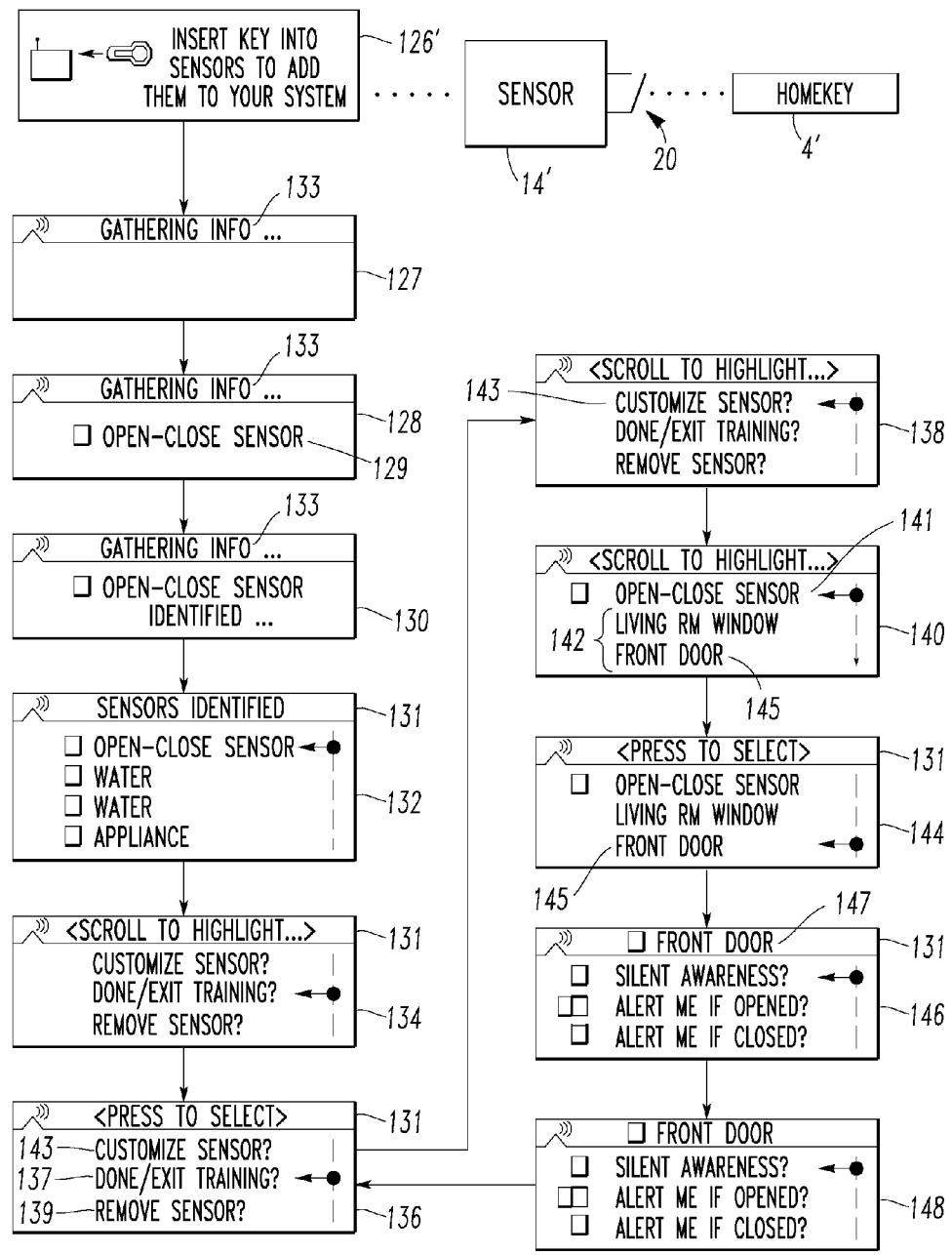

FIG. 10 shows the user interface of the server 2' for the USB ZigBee dongle 56 of FIG. 11 and the fob slide 58 of FIG. 4. For this example, the USB ZigBee dongle 56 is coupled to the PC USB port 8, while the fob slide 58 is employed to trigger a sensor 14 or device 16 to join the wireless system 12. Here, FIG. 8 still applies, although suitable text (e.g., "ZigBee dongle") (not shown) is preferably employed rather than "HomeKey". The fob slide 58 has no electronics, only the example magnets 62 to trigger the sensor 14 or device 16 to send messages directly to the USB ZigBee dongle 56 at the server 2'.

This user interface of FIG. 10 is substantially the same as the user interface of FIG. 9, except that the screen 126', unlike the screen 126, does not indicate to reconnect the USE ZigBee dongle 56 to the server USE port 8, since it is not disconnected. Instead, the fob slide 58 is employed to engage the sensors 14 or devices 16, in order to add them to the system 12 of FIG. 1. Also, the USB ZigBee dongle 56 and fob slide 58 do not store the sensor/device identifier and profile and do not activate the annunciator 42 (e.g., without limitation, blink an LED; sound a buzzer).

For this example, the user must confirm (authenticate) at the server 2' that the sensor 14 or device 16 can join the system 12. Here, screen 132 lists the sensors 14 and devices 16 that have joined the wireless system 12. There, the user selects a device or sensor, and the screen 134 is shown. Then, the user confirms (authenticates) the sensor or device by "customizing" it (e.g., by providing, for example, name; awareness; other suitable configuration information). Otherwise, the user denies joining by "removing" such sensor or device. This is repeated for each sensor or device listed by the screen 132. If a sensor or device is neither customized nor removed, then it remains on that list, but it will generate no alerts.

Example 16

The user interface of the server 2 for the wireless module 4 of FIG. 1 may be substantially the same as FIG. 6B of U.S. Patent Application Pub. No. 2005/0085248.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A wireless system comprising:
a server comprising a port;
a number of sensors or devices, each of said number of sensors or devices comprising a wireless transceiver and a proximity sensor; and
a wireless module comprising:
a port interconnected with the port of said server,
a wireless transceiver cooperating with the port of said wireless module, the wireless transceiver of said wireless module being structured to wirelessly communicate with the wireless transceiver of said number of sensors or devices,
a proximity sensor structured to sense one of said number of sensors or devices, and
a target structured to be sensed by the proximity sensor of said one of said number of sensors or devices,
wherein the port of said server is structured to cooperate with the port of said wireless module to transmit and receive wireless messages, said port of said wireless module cooperating with said wireless transceiver of said wireless module to transmit and receive said wireless messages.

2. The wireless system of claim 1 wherein said server is a personal computer.

3. The wireless system of claim 1 wherein said server further comprises a display.

4. The wireless system of claim 1 wherein the port of said wireless module and the port of said server are USB ports; and wherein the USB port of said wireless module is interconnected with the USB port of said server by a USB cable having a length of about three feet to about six feet.

5. The wireless system of claim 1 wherein said wireless module is structured to be powered from the port of said server.

6. The wireless system of claim 1 wherein the wireless transceiver of said wireless module and the wireless transceiver of said number of sensors or devices are ZigBee wireless transceivers.

7. The wireless system of claim 1 wherein said one of said number of sensors or devices is structured to sense said target and responsively send a first wireless message to the wireless transceiver of said wireless module; wherein said server is structured to receive said first wireless message and send a second wireless message to said one of said number of sensors or devices through the wireless transceiver of said wireless module, in order to confirm receipt of said first wireless message; wherein said one of said number of sensors or devices is structured to receive said second wireless message and responsively send a third wireless message to the wireless transceiver of said wireless module, said third wireless message including profile information of said one of said number of sensors or devices; and wherein said server is structured to receive said third wireless message and send a fourth wireless message to said one of said number of sensors or devices through the wireless transceiver of said wireless module, in order to confirm receipt of said third wireless message.

8. The wireless system of claim 1 wherein a number of said number of sensors or devices is structured to send state information to the wireless transceiver of said wireless module.

9. The wireless system of claim 8 wherein one of said number of sensors or devices is a sensor structured to sense a proximity condition change of an input and send a first wireless message to the wireless transceiver of said wireless module; and wherein said server is structured to receive said first wireless message and send a second wireless message to said sensor through the wireless transceiver of said wireless module, in order to confirm receipt of said first wireless message.

10. A wireless system comprising:
a server comprising a port;
a number of sensors or devices, each of said number of sensors or devices comprising a wireless transceiver and a proximity sensor; and
a wireless module comprising:
a port structured to be interconnected with the port of said server,
a processor,
a power source structured to be powered through the port of said wireless module when interconnected with the port of said server, and/or to temporarily power said wireless module when the port of said wireless module is disconnected from the port of said server,
a wireless transceiver cooperating with the port of said wireless module, the wireless transceiver of said wireless module being structured to wirelessly communicate with the wireless transceiver of said number of sensors or devices,
a proximity sensor structured to sense one of said number of sensors or devices,
a target structured to be sensed by the proximity sensor of said one of said number of sensors or devices, and
an annunciator structured to be activated after the proximity sensor of said wireless module senses one of said number of sensors or devices, and after said target is sensed by the proximity sensor of said one of said number of sensors or devices,
wherein the port of said server is structured to cooperate with the port of said wireless module to transmit and receive wireless messages when said port of said server is interconnected with the port of said wireless module, said port of said wireless module cooperating with said wireless transceiver of said wireless module to transmit and receive said wireless messages, and
wherein said wireless module is structured to transmit and receive wireless messages through the wireless transceiver thereof when disconnected from the port of said server.

11. The wireless system of claim 10 wherein said annunciator is one of a visual annunciator and an audible annunciator.

12. The wireless system of claim 10 wherein said processor is structured to activate said annunciator after the proximity sensor of said wireless module senses one of said number of sensors or devices, and after said one of said number of sensors or devices is joined to a wireless communication network.

13. The wireless system of claim 12 wherein the port of said wireless module is structured to be reconnected to the port of said server after said processor activates said annunciator.

14. The wireless system of claim 10 wherein said power source comprises an ultra-capacitor and a charging circuit structured to charge said ultra-capacitor from the port of said server when interconnected with the port of said wireless module.

15. The wireless system of claim 10 wherein said processor comprises a nonvolatile memory structured to store information from one of the wireless messages received by the wireless transceiver of said wireless module when disconnected from the port of said server.

16. The wireless system of claim 15 wherein said processor is structured to transfer the stored information from said nonvolatile memory and through the port of said wireless module to the port of said server after said wireless module is reconnected to the port of said server.

17. The wireless system of claim 15 wherein said one of said number of sensors or devices further comprises an identifier and a profile; and wherein said stored information includes said identifier and said profile.

18. The wireless system of claim 10 wherein said power source is a power module comprising a battery and a connector structured to connect to the port of said wireless module when disconnected from the port of said server, said power module being structured to temporarily power said wireless module when the port of said wireless module is disconnected from the port of said server.

19. The wireless system of claim 18 wherein the port of said wireless module and the port of said server are USB ports; wherein said connector is a first USB connector having a first polarity; and wherein said power module further comprises a second USB connector having an opposite second polarity, said second USB connector being structured to be connected to the USB port of said server when the USB port of said wireless module is disconnected from the USB port of said server, said battery being charged from the USB port of said server and through said second USB connector.

20. A wireless system comprising:
a server comprising a port;
a number of sensors or devices, each of said number of sensors or devices comprising a wireless transceiver and a proximity sensor;
a first wireless module comprising:
  a port interconnected with the port of said server, and
  a wireless transceiver cooperating with the port of said first wireless module, the wireless transceiver of said first wireless module being structured to wirelessly communicate with the wireless transceiver of said number of sensors or devices; and
a second module separate from said first wireless module, said second module comprising a target structured to be sensed by the proximity sensor of one of said number of sensors or devices,
wherein the port of said server is structured to cooperate with the port of said first wireless module to transmit and receive wireless messages, said port of said first wireless module cooperating with said wireless transceiver of said wireless module to transmit and receive said wireless messages.

21. The wireless system of claim 20 wherein said target is a number of magnets; and wherein said second module comprises a molded housing housing said number of magnets therein.

22. The wireless system of claim 20 wherein the target of said second module is structured to be sensed by the proximity sensor of said one of said number of sensors or devices, in order to cause said one of said number of sensors or devices to join a wireless communication network including said first wireless module.

23. The wireless system of claim 22 wherein said server is structured to accept input to confirm that said one of said number of sensors or devices may join the wireless communication network.

24. The wireless system of claim 22 wherein said wireless transceiver of said first wireless module is structured to receive one of said wireless messages from said one of said number of sensors or devices after the target of said second module is sensed by the proximity sensor of said one of said number of sensors or devices.

25. A wireless module for a wireless system including a server having a port, said wireless system also including a number of sensors or devices, each of said number of sensors or devices comprising a wireless transceiver and a proximity sensor, said wireless module comprising:
a port structured to be interconnected with the port of said server;
a wireless transceiver cooperating with the port of said wireless module, the wireless transceiver of said wireless module being structured to wirelessly communicate with the wireless transceiver of said number of sensors or devices;
a proximity sensor structured to sense one of said number of sensors or devices; and
a target structured to be sensed by the proximity sensor of said one of said number of sensors or devices,
wherein the port of said server is structured to cooperate with the port of said wireless module to transmit and receive wireless messages, said port of said wireless module cooperating with said wireless transceiver of said wireless module to transmit and receive said wireless messages.

26. A wireless module for a wireless system including a server having a port, said wireless system also including a number of sensors or devices, each of said number of sensors or devices comprising a wireless transceiver and a proximity sensor, said wireless module comprising:
a port structured to be interconnected with the port of said server;
a processor;
a power source structured to be powered through the port of said wireless module when interconnected with the port of said server, and/or to temporarily power said wireless module when the port of said wireless module is disconnected from the port of said server;
a wireless transceiver cooperating with the port of said wireless module, the wireless transceiver of said wireless module being structured to wirelessly communicate with the wireless transceiver of said number of sensors or devices;
a proximity sensor structured to sense one of said number of sensors or devices;
a target structured to be sensed by the proximity sensor of said one of said number of sensors or devices; and
an annunciator structured to be activated after the proximity sensor of said wireless module senses one of said number of sensors or devices, and after said target is sensed by the proximity sensor of said one of said number of sensors or devices, wherein the port of said server is structured to cooperate with the port of said wireless module to transmit and receive wireless messages when said port of said server is interconnected with the port of said wireless module, said port of said wireless module cooperating with said wireless transceiver of said wireless module to transmit and receive said wireless messages, and wherein said wireless module is structured to transmit and receive wireless messages through the wireless transceiver thereof when disconnected from the port of said server.

* * * * *